(12) United States Patent
Li et al.

(10) Patent No.: US 9,787,777 B2
(45) Date of Patent: Oct. 10, 2017

(54) METHODS AND APPARATUS FOR WIRELESS COMMUNICATIONS INCLUDING DIRECT PAGING IN COMBINATION WITH HOPPED DATA SIGNALING

(75) Inventors: Junyi Li, Bedminter, NJ (US); Rajiv Laroia, Far Hills, NJ (US); Vincent D. Park, Budd Lake, NJ (US); Thomas Richardson, South Orange, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1426 days.

(21) Appl. No.: 12/047,713

(22) Filed: Mar. 13, 2008

(65) Prior Publication Data
US 2009/0232034 A1 Sep. 17, 2009

(51) Int. Cl.
*H04L 12/28* (2006.01)
*H04L 29/08* (2006.01)
(Continued)

(52) U.S. Cl.
CPC .............. *H04L 67/16* (2013.01); *H04L 67/18* (2013.01); *H04W 4/02* (2013.01); *H04W 68/00* (2013.01); *H04W 4/021* (2013.01); *H04W 40/246* (2013.01)

(58) Field of Classification Search
CPC ... H04W 84/18; H04W 8/005; H04W 84/047; H04W 88/04; H04W 52/46; H04W 74/00;
(Continued)

(56) References Cited

U.S. PATENT DOCUMENTS 5,721,733 A * 2/1998 Wang et al. ................... 370/332
6,130,881 A * 10/2000 Stiller et al. .................. 370/238
(Continued)

FOREIGN PATENT DOCUMENTS

| CN | 1689308 A | 10/2005 |
|---|---|---|
| CN | 1716909 A | 1/2006 |

(Continued)

OTHER PUBLICATIONS

/International Search Report & Written Opinion—PCT/US2009/035040, International Search Authority—European Patent Office—Jun. 5, 2009.
(Continued)

*Primary Examiner* — Alex Skripnikov
*Assistant Examiner* — Lionel Preval
(74) *Attorney, Agent, or Firm* — James K. O'Hare (57) ABSTRACT

Methods and apparatus for wireless communications in regional networks, e.g., ad hoc peer to peer networks, are described. Wireless communications devices transmit and monitor for presence indicator signals broadcast from other peer communications devices in its local vicinity. A wireless communications device maintains a list of discovered devices in its vicinity. A first wireless communications device transmits a paging signal directly over an airlink to a second communications device, which is on its list and to which it desires to send data units, e.g., user data in a peer to peer traffic segment. In response to a received paging response signal from the second device, the first device transmits data units, intended for the second device, to a third device, which acts as an intermediary node. The power level for the data unit signal is controlled to be lower than the power level used for the paging signal. FIG. 4

37 Claims, 4 Drawing Sheets

(51) Int. Cl.
*H04W 4/02* (2009.01)
*H04W 68/00* (2009.01)
*H04W 40/24* (2009.01)

(58) Field of Classification Search
CPC ............ H04W 40/005; H04W 40/246; H04W 40/248; H04W 48/14; H04W 76/023; H04W 76/025; H04B 7/15592; H04M 1/7253; H04L 67/104; H04L 67/1068
USPC ....... 370/315, 338, 332, 401, 329, 328, 356, 370/238; 455/161.2, 522, 413, 410, 455/414.1; 375/132, 272
IPC ............ H04L 67/16,67/18; H04W 4/02, 4/021, 40/246, 68/00
See application file for complete search history.

(56) References Cited

U.S. PATENT DOCUMENTS

| | | | |
|---|---|---|---|
| 6,188,885 B1* | 2/2001 | Kolev ................ | H04B 7/18567 375/272 |
| 6,539,211 B1* | 3/2003 | Abrishamkar et al. .... | 455/161.2 |
| 6,678,341 B1* | 1/2004 | Miyake et al. ............... | 375/356 |
| 6,996,368 B2 | 2/2006 | Orlik et al. | |
| 7,336,927 B2 | 2/2008 | Diaz Cervera et al. | |
| 7,353,018 B2* | 4/2008 | Mauney ............ | H04M 1/72519 455/410 |
| 7,515,924 B2* | 4/2009 | Nanda et al. ................. | 455/522 |
| 7,558,226 B2 | 7/2009 | Anderson et al. | |
| 7,940,781 B2* | 5/2011 | Poustchi et al. .............. | 370/401 |
| 2002/0075940 A1* | 6/2002 | Haartsen ................ | H04B 1/713 375/132 |
| 2004/0125776 A1* | 7/2004 | Haugli .................... | H04L 12/12 370/338 |
| 2004/0227618 A1 | 11/2004 | Hwang et al. | |
| 2005/0058109 A1* | 3/2005 | Ekberg ............. | H04L 29/12113 370/338 |
| 2005/0090270 A1 | 4/2005 | Jou et al. | |
| 2006/0013160 A1* | 1/2006 | Haartsen ....................... | 370/328 |
| 2007/0160014 A1* | 7/2007 | Larsson ........................ | 370/338 |
| 2009/0017797 A1* | 1/2009 | Li ......................... | H04L 67/104 455/414.1 |
| 2009/0116430 A1* | 5/2009 | Bonta et al. .................. | 370/329 |

FOREIGN PATENT DOCUMENTS

| | | | |
|---|---|---|---|
| CN | 101124762 A | 2/2008 | |
| DE | 4442431 A1 | 6/1995 | |
| EP | 1107522 A1 | 6/2001 | |
| EP | 1107552 A2 | 6/2001 | |
| EP | 1852984 A2 | 11/2007 | |
| JP | 2003158525 A | 5/2003 | |
| RU | 2275742 C2 | 4/2006 | |
| SE | EP 1107522 A1 * | 6/2001 | ............ H04W 94/20 |
| WO | WO2008003679 A1 | 1/2008 | |

OTHER PUBLICATIONS

Taiwan Search Report—TW098107734—TIPO—Oct. 17, 2012.
Hou C., et al.,"Topology control in heterogeneous wireless networks: problems and solutions", INFOCOM 2004, Twenty-third AnnualJoint Conference of the IEEE Computer and Communications Societies, IEEE, Mar. 11, 2004, pp. 232-243.
Taiwan Search Report—TW098107734—TIPO—Mar. 10, 2012.

* cited by examiner

METHODS AND APPARATUS FOR WIRELESS COMMUNICATIONS INCLUDING DIRECT PAGING IN COMBINATION WITH HOPPED DATA SIGNALING

FIELD

Various embodiments relate to wireless communications methods and apparatus and, more particularly, to wireless communications methods and apparatus which support direct peer device paging in combination with hopped data communications via an intermediary node.

BACKGROUND

One approach used to support multi-hop communications is for each node in the system to periodically broadcast a routing table identifying other nodes with which it can have a direct connection for the communication of data. In such a system a node can learn from an adjacent node's routing table that a route exists for it to communicate data with a more distance node by using the adjacent node as an intermediary.

One problem with this approach is that the cost associated with each node having to periodically communicating its routing table can be large from both an air link resource usage perspective and a power consumption perspective. The amount of air link resources required to be dedicated for conveying the broadcast routing tables can represent a relatively high level of overhead signaling, thus limiting the amount of air link resources available for traffic data signaling. In applications where the communications devices which are broadcasting routing tables are battery powered devices, power consumption can also be an issue of concern. For example, a battery powered portable wireless device, which may infrequently have a need to transmit traffic, in such a system, would tend to drain its battery by having to periodically broadcast its routing table so that other devices could benefit.

In view of the above discussion, there are a need for new and improved methods and apparatus for supporting multi-hop data signaling. Methods and apparatus that support peer discovery and multi-hop routing, yet tend to conserve battery power would be beneficial. Methods and apparatus for supporting multi-hop data signaling that do not require a proactive broadcast of a routing table would also be beneficial.

SUMMARY

Wireless communications devices in a regional network, e.g., an ad-hoc peer to peer network, discover one another via presence indicator signals which are broadcast from each device and recovered directly by other devices in the vicinity. A wireless terminal monitors for and detects presence indicator signals, updating and maintaining a list of devices currently in its vicinity with which it may seek to establish communications. A first communications device seeking to establish communications with a second communications device, currently on its list, sends a paging signal directly to the second communications device. Then, the first communications device monitors for a paging response signal from the second communications device. In response to a received paging response signal from the second device, the first communications device transmits data units, directed to the second communications device, to a third communications device which is acting as an intermediary or hop point in the data unit routing. The power levels used for the data unit signal is, in some embodiments, controlled to be lower than the power level used for the transmitted paging signal.

In various embodiments, a presence indicator signal is a lightweight signal, which communicates a small amount of information, which is sufficient for device discovery but is not sufficient by itself to determine a multi-hop route or set-up a multi-hop routing table corresponding to the device which transmitted the presence indicator signal. In some embodiments, the presence indicator signal conveys only an identifier corresponding to the device which transmitted the presence indicator signal. In some other embodiments, the presence indicator signal also conveys a limited amount of additional information including one or more of: a device type indicator, information identifying device functionality, and information used to interpret the content of the presence indicator signal. By restricting the amount of information conveyed in the presence indicator signal, air link resources and power are conserved over an approach which requires each communications device to periodically broadcast its routing table.

Following discovery operations, direct paging between devices is used, as needed, to open up a larger data channel used for sending a user data packet. The user data packet may be, and sometimes is, communicated indirectly between the two devices which exchanged direct paging signals, the data being communicated via an intermediary node. Thus the power level used for transmitting the data signals, which typically consume a larger amount of the air link resources, can be lower than the power level for paging signals, if an intermediary node is available for relaying data, thus conserving power and lowering interference levels.

An exemplary method of operating a first communications device to communicate with a second communications device comprises: transmitting a paging signal directly to said second communications device over an airlink; and transmitting data, directed to said second communications device, to a third communications device. An exemplary first communications device, in accordance with some embodiments, comprises: a paging signal generation module for generating a paging signal directed to said second communications device; a hopped route data signal generation module for generating data units directed to said second communications device to be communicated via a third communications device; and a wireless transmitter module for transmitting said paging signal directly to said second communications device over an airlink and for transmitting data units, directed to said second communications device, to said third communications device. In one example, the first communications device and second communications device are in a region including the third communications device, e.g., the first second and third communications devices are located in the same region and are part of an ad-hoc peer to peer communications network.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
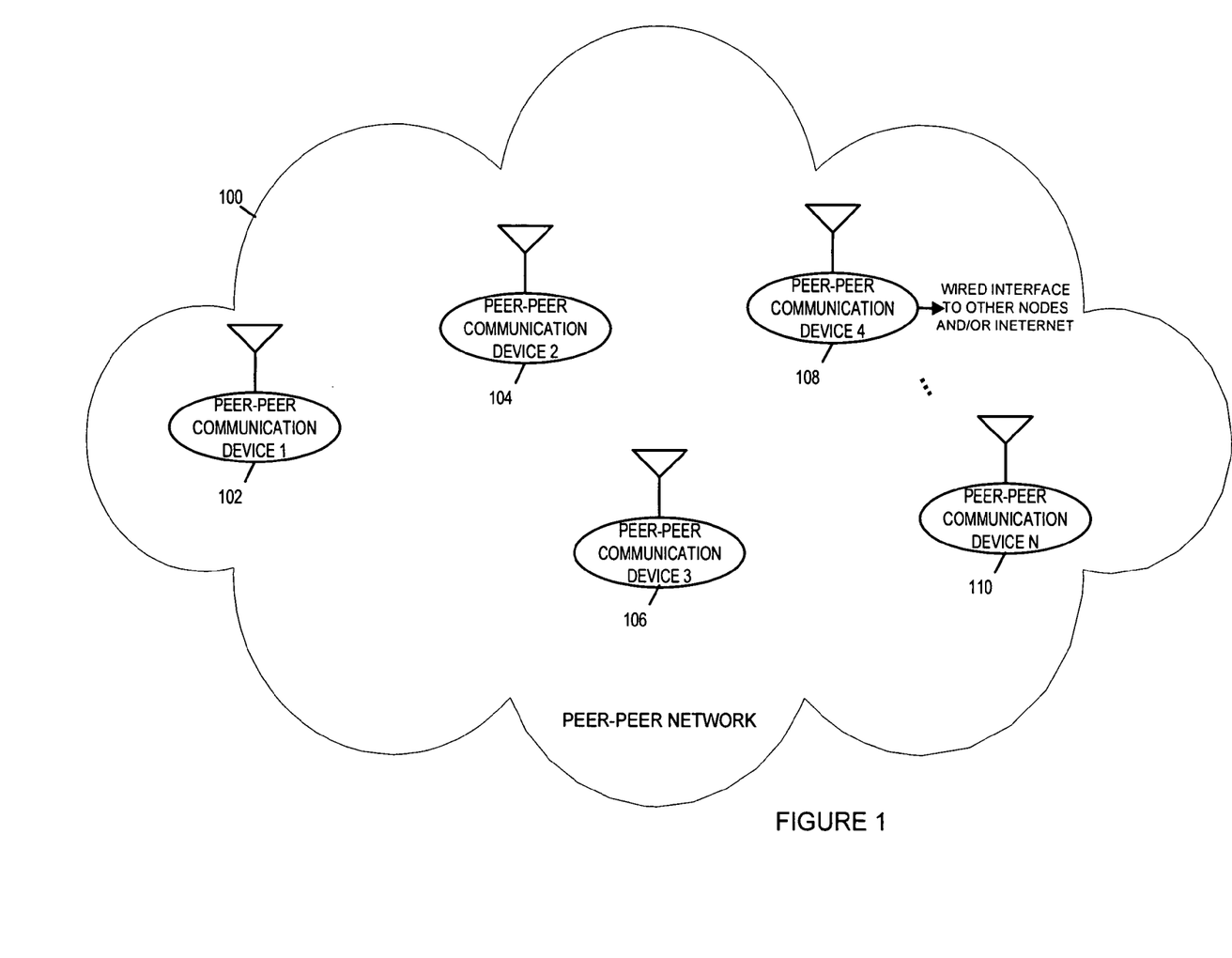
FIG. 1 is a drawing of an exemplary peer to peer communications network, e.g., an ad-hoc peer to peer communications network in a local region, in accordance with one exemplary embodiment.

FIG. 1 is a drawing of an exemplary peer to peer communications network 100, e.g., an ad-hoc peer to peer communications network in a local region, in accordance with one exemplary embodiment. Exemplary communications network 100 includes a plurality of peer to peer wireless communications devices (device 1 102, device 2 104, device 3 106, device 4 108, . . . , device N 110). The wireless communications devices (102, 104, 106, 108, . . . 110) support presence indicator signaling for peer discovery, direct paging signaling between peers, and data transmissions between peers with routing which may, and sometimes does include multiple hops. Thus a first peer to peer device discovers another peer to peer device in its local vicinity via direct signaling and sends a page directly to the second device, yet the first communications device may, and sometimes does, send data, e.g., user data in a peer to peer traffic segment to the second device via an intermediary, e.g., a third node. Some of the peer to peer communications devices, e.g., device 4 108, also include a wired interface, which couples the peer to peer communications device to other nodes and/or the Internet, in addition to a wireless communications interface. Some of the peer to peer communications devices are mobile communications devices, e.g., handheld mobile communications devices.

Figure 2:
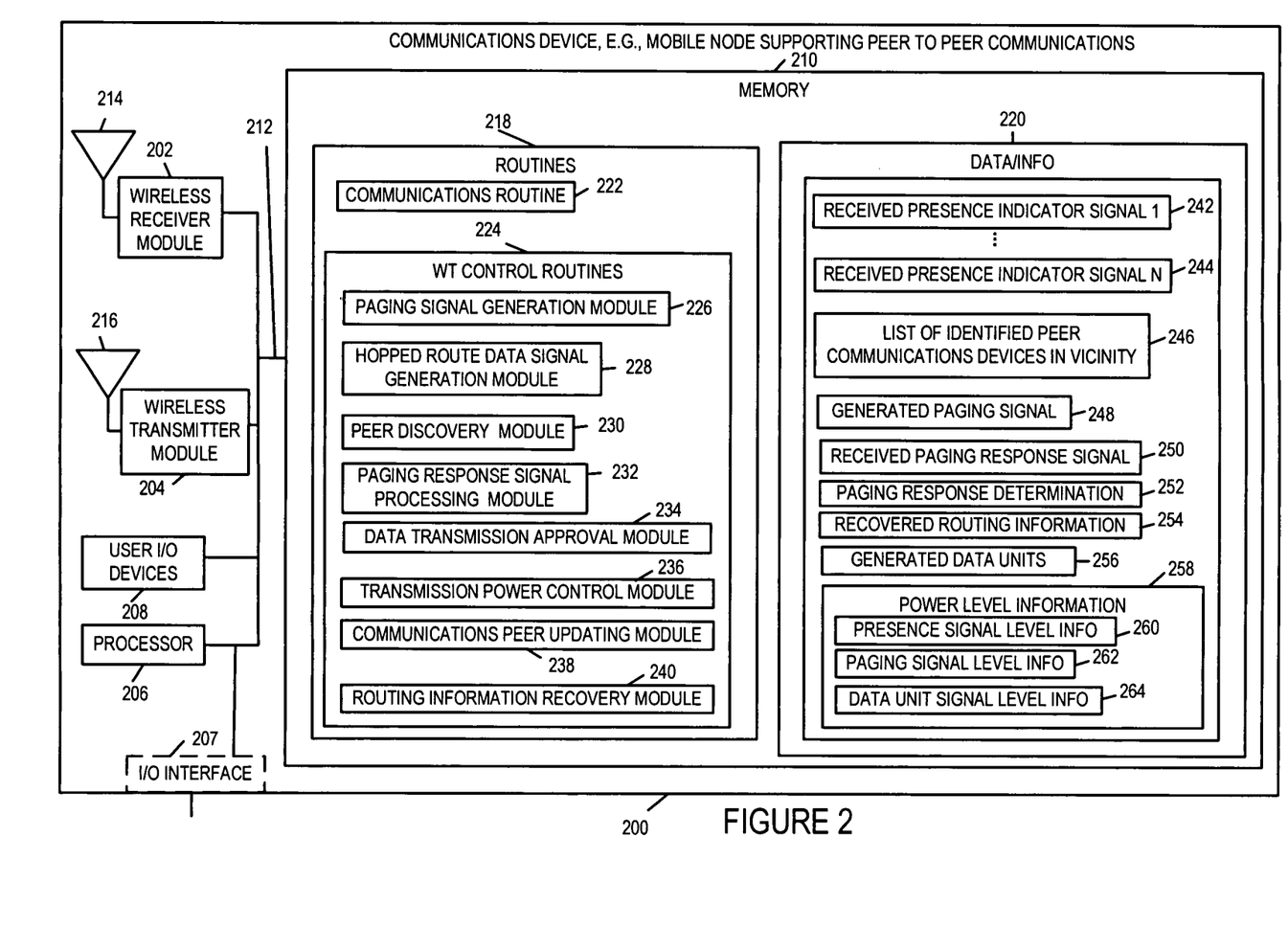
FIG. 2 is a drawing of an exemplary communications device, e.g., a peer to peer communications device, in accordance with an exemplary embodiment.

FIG. 2 is a drawing of an exemplary communications device 200, e.g., a mobile node supporting peer to peer communications, in accordance with an exemplary embodiment. Exemplary communications device 200 is, e.g., any of the communications devices (102, 104, 106, 108, 110) of network 100 of FIG. 1.

Exemplary communications device 200 includes wireless receiver module 202, wireless transmitter module 204, a processor 206, user I/O devices 208, and memory 210 coupled together via a bus 212 over which the various elements may interchange data and information. In some embodiments, device 200 also includes an I/O interface 207 coupled to bus 212, e.g., a wired interface, via which communications device 200 may be coupled to a backhaul network including other network nodes, a cellular network, and/or the Internet.

Memory 210 includes routines 218 and data/information 220. The processor 206, e.g., a CPU, executes the routines 218 and uses the data/information 220 in memory 210 to control the operation of the communications device 200 and implement methods, e.g., a method in accordance with flowchart 400 of FIG. 3 or in accordance with the signaling flow described in FIG. 4.

Routines 218 include a communications routine 222 and wireless terminal control routines 224. The communications routine 222 implements the various communications protocols used by the communications device 200. The wireless terminal control routines 224 include a paging signal generation module 226, a hopped route data signal generation module 228, a peer discovery module 230, a paging response signal processing module 232, a data transmission approval module 234, a transmission power control module 236, a communications peer updating module 238, and a routing information recovery module 240.

Data/information 220 includes received presence indication signals (received presence indicator signal 1 242, . . . , received presence indicator signal N 244), a maintained list of identified peer communications devices in the vicinity 246, a generated paging signal 248, a received paging response signal 250, a paging response determination 252, recovered routing information 254, generated data units 256, and power level information 258. The power level information 258 includes presence signal level information 260, paging signal level information 262 and data unit signal level information 264.

Wireless receiver module 202, e.g., an OFDM receiver, is coupled to receive antenna 214 via which the communications device 200 receives signals from other communications devices in the region. Received signals include presence indicator signals, paging response signals, and routing information signals. Wireless receiver module 202 is for receiving, prior to receiving a paging signal, a presence indicator signal communicated over an airlink directly from a second communications device. Wireless receiver module 202 is also for receiving, following transmission of a paging signal, and prior to transmitting data, a paging response signal, which is in response to the paging signal, over an airlink directly from the second device. Wireless receiver module 202 is also for receiving a signal from a third communications device, prior to transmitting data, directed to said second communications device, to said third communications device, e.g., the signal from the third communications device being a routing information signal. The second communications device is, e.g., a peer communications device with which communications device 200 exchanges direct paging signals, while the third communications device is an intermediary node, used by communications device 200 and the second communications device to communicate data between device 200 and the second device.

Wireless transmitter module 204, e.g., an OFDM transmitter, is coupled to transmit antenna 216 via which the communications device 200 transmits signals to other communications devices in the region. In some embodiments, the same antenna is used for the receiver and the transmitter. Transmitted signals include paging signals and data unit signals. Wireless transmitter module 204 transmits paging signals directly to a second communications device over an airlink and transmits data units directed to the second communications device to a third communications device. Thus paging signaling is direct, while traffic data signaling may be, and sometimes is, indirect signaling including multiple hops. The data units may include user data, e.g., peer to peer traffic data conveying text, audio, and/or image data.

Paging signal generation module 226 is for generating a paging signal directed to a second communications device. Hopped route data signal generation module 228 is for generating data units, e.g., packets, directed to a second communications device to be communicated via a third communications device. The data units are, e.g., packets of peer to peer traffic data conveying user data such as voice, image and/or text data.

Peer discovery module 230 is for determining a source of a received data indicator signal, e.g., determining whether a received data indicator signal is from the second communications device. Thus peer discovery module 230 identifies the source of the received indicator signal, e.g., by a decoding operation which correlates signal characteristic information, e.g., tone used, or recovered bits with a mapping to a specific wireless terminal. Paging response signal processing module 232 processes a received paging response signal and determines if the received paging response signal represents a positive response to a previously transmitted paging signal from device 200. Data transmission approval module 234 controls the transmission of data to a second device to proceed in response to a received paging response signal.

Transmission power control module 236, using power level information 258, in some embodiments, controls the transmitter module 204 to transmit a paging signal at a higher power level per information bit than the power level per information bit used for transmitting data units. Transmission power control module 236, using power level information 258, in some embodiments, controls the transmitter module 204 to transmit a paging signal at a higher total power level than the total power level used for transmitting data units.

Communications peer updating module 238 updates a list of devices with which device 200 can communicate based on the received presence indicator signals. In some embodiments, a presence indicator signal is a signal which communicates an identifier corresponding to another device, e.g., a second device. In various embodiments, the presence indicator signal is a lightweight signal used for discovery, and the indicator signal by itself is not sufficient to determine multi-hop routing or set-up a multi-hop routing table. In some embodiments, a presence indicator signal communicates only an identifier used to identify corresponding to the device which transmitted the presence indicator signal. In some embodiments, the presence indicator signal communicates information in a set of information consisting of one or more of the following: i) one or more identifiers corresponding to the device which transmitted the presence indicator signal, ii) information indicating the type of the device which transmitted the presence indicator signal, iii) functionality supported by the device which transmitted the presence indicator signal, and iv) information used to interpret the content of the presence indicator signal. In various embodiments, the information used to interpret the content of the presence indicator signal may include, e.g., flags indicating how to process content, information indicating the number of fields in a message, information indicating the number of bits in each field, and/or a message type indicator.

Routing information recovery module 240 recovers a signal including information from a third device indicating that the third device can act as an intermediary between device 200 and a second communications device for the communication of data. In some embodiments, the signal from the third communications device includes an identifier corresponding to the third device.

Received presence indicator signals (242, 244) represent signals which are received by wireless receiver module 202 and processed by peer discovery module 230. List of identified peer communications devices in vicinity 246 is a list being maintained and updated by peer discovery module 230 which identifies devices with which communications device 200 can seek to establish a page. List 246 includes peer devices corresponding to detected presence indicator signals (242, 244).

Generated paging signal 248 is an output of paging signal generation module 228, is a direct paging signal, and is transmitted by wireless transmitter module 204. Received paging response signal 250 is a signal received, by wireless receiver module 202 and processed by paging response signal processing module 232. Paging response determination 252 is a determination performed by paging response signal processing module 232, e.g., determining if a positive response to the paging signal 248 was received. In some embodiments, a detected paging response signal from the device to which the page was directed indicates a positive response, and the lack of a page response signal indicates a negative response. In some embodiments, there is a predetermined relationship between the air link resource on which the page was transmitted and the air link resource corresponding to the page response signal. In some such embodiments, a page response signal does not include a device identifier corresponding to the device which transmitted the page response signal.

Recovered routing information 254 includes information recovered from a received routing information signal received by wireless receiver module 202 and processed by routing information recovery module 240. Generated data units 256 is an output of hopped route data signal generation module 228. Generated data units 256 is, e.g., a peer to peer traffic signal conveying user data directed to a second communications device, which device 200 has previously paged and previously received a positive page response, but transmitted by wireless transmitter module 204 to a third device which is to act as intermediary hop point in delivery of the traffic data to the second device.

Power level information 258 includes information used by transmission power level control module 236 to control the wireless transmitter device 204 to transmit different types of signals at different power levels. In some embodiments, the presence signal level information 260 and the data unit signal level information 264 indicates that the presence level signal is to be transmitted at a higher power level per information bit than the transmit power level per information bit for a data unit signal. In some embodiments, the paging signal level information 262 and the data unit signal level information 264 indicates that the paging level signal is to be communicated at a higher power level per information bit than the power level per information bit for a data unit signal. In some embodiments, the presence signal level information 260 and the data unit signal level information 264 indicate that the presence level signal is to be transmitted at a higher total power level than the total power level for a data unit signal. In some embodiments, the paging signal level information 262 and the data unit signal level information 264 indicates that the paging level signal is to be transmitted at a higher total power level than the total power level for a data unit signal. In some embodiments, the presence signal level information 260 and the data unit signal level information 264 indicates that the presence level signal is to be transmitted at a higher power level per air link resource unit than the transmit power level per air link resource unit for a data unit signal. In some embodiments, the paging signal level information 262 and the data unit signal level information 264 indicates that the paging level signal is to be communicated at a higher power level per air link resource unit than the power level per air link resource unit for a data unit signal. In some embodiments, the air link resource unit is an OFDM tone-symbol, representing one tone for one OFDM symbol transmission time interval.

Figure 3:
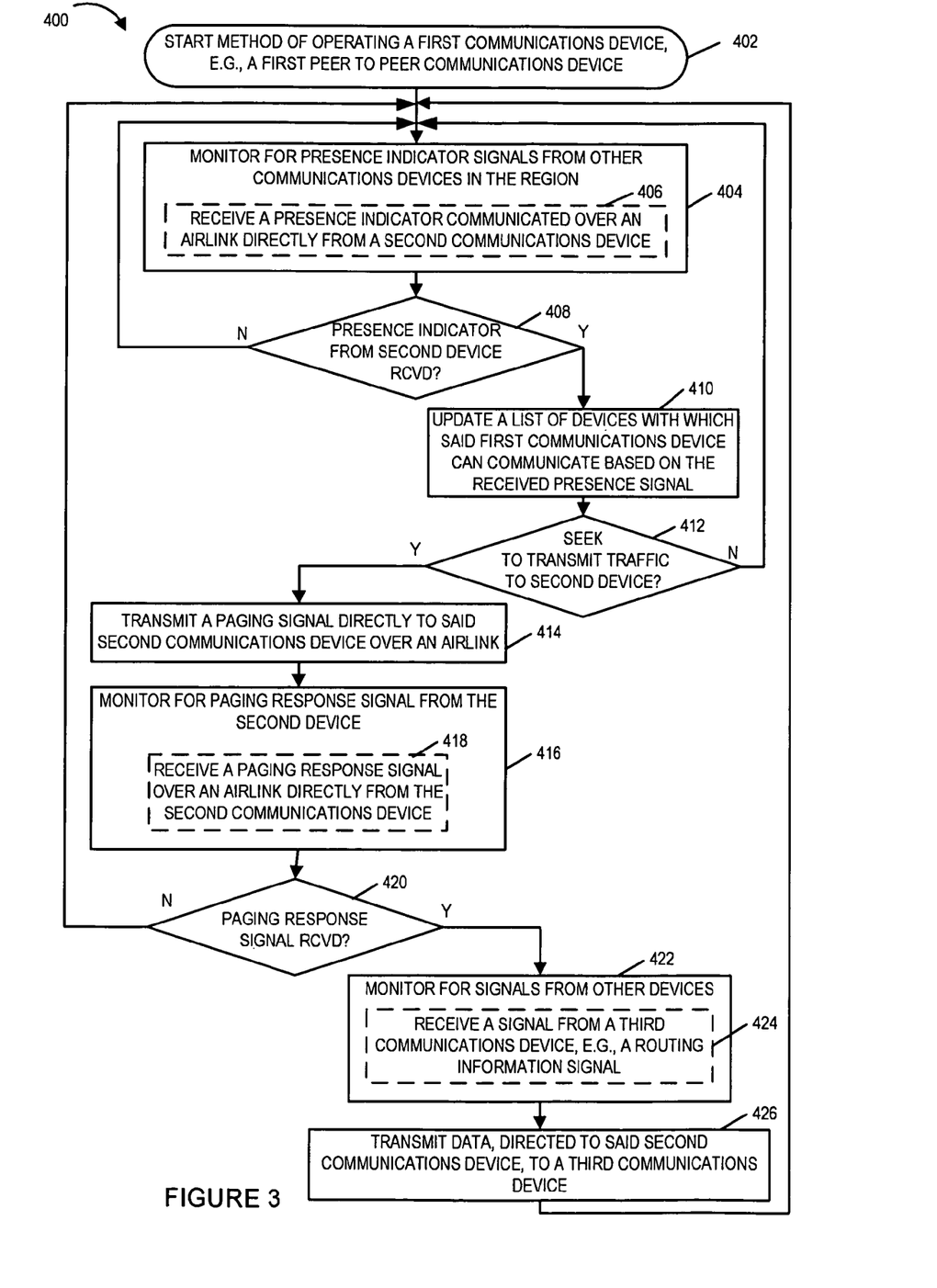
FIG. 3 is a flowchart of an exemplary method of operating a first communications device, e.g., a first peer to peer communications device, to communicate with a second peer to peer communications device.

FIG. 3 is flowchart 400 of an exemplary method of operating a first communications device, e.g., a first peer to peer communications device, with a second communications device, e.g., a second peer to peer communications device. The first and second communications devices are in a region with a third communications device, e.g., a third peer to peer communications device. Operation of the exemplary method starts in step 402 where the first communications device is powered on and initialized. Operation proceeds from start step 402 to step 404.

In step 404 the communications device monitors for the presence of indicator signals from other communications devices in the region. During the monitoring the first communications device may, and sometimes does, perform sub-step 406 in which the first communications device receives a presence indicator signal communicated directly over an airlink from a second communications device. In some embodiments, the presence indicator is a signal which communicates an identifier corresponding to the second device. In some such embodiments, the presence indicator signal is a signal which communicates only an identifier corresponding to the second device. In various embodiments, the presence indicator signal communicates information in a set of information consisting of: i) one or more identifiers corresponding to the second communications device; (ii) information indicating the type of the second communications device; (iii) functionality supported by the second communications device; and (iv) information used to interpret the content of the presence indicator signal. Information used to interpret the content of the presence indicator signal may include, e.g., flags indicating how to process content, information indicating the number of fields in the message, information indicating the number of bits in each filed, information indicating a message type indicator, etc. Operation proceeds from step 404 to step 408.

In step 408, the communications device determines whether or not a presence indicator signal was received from the second device and proceeds as a function of whether or not the presence indicator signal was received. If a presence indicator signal was not received from the second device, then operation proceeds from step 408 back to step 404, e.g., to perform monitoring for presence indicator signals during the next interval during which presence indicator signals are communicated. However, if a presence indicator signal was received from the second device, then operation proceeds from step 408 to step 410.

In step 410, the first communications device updates a list of devices with which said first communications device can communicate based on the received presence indicator signal. Then, in step 412 the first communications device decides if it seeks to transmit traffic to the second device. If it does not wish to transmit traffic to the second device, operation proceeds from step 412 back to step 404, e.g. to perform monitoring for presence indicator signals during the next interval during which presence indicator signals are communicated. However, if the first communications device seeks to transmit traffic to the second device, then operation proceeds from step 412 to step 414.

In step 414 the first communications device transmits a paging signal directly to said second communications device over an airlink. Then, in step 416 the first communications device monitors to receive a paging response signal from the second device. During the monitoring, sub-step 418 may be, and sometimes is, performed. In sub-step 418 the first communications device receives a paging response signal over an airlink directly from the second communications device. Operation proceeds from step 416 to step 418.

If in step 420, the first communications device determines that a paging response signal was not received from the second communications device, then operation proceeds from step 420 to step 404. However, if a paging response signal, e.g., a positive response signal in response to the request of transmitted signal of step 414, was received from the second communications, then operation proceeds from step 420 to step 422. In step 422 the first communications device monitors for signals from other communications devices. In some embodiments, step 422 may, and sometimes does include sub-step 424. In sub-step 424 the first communications device receives a signal from a third communications device, e.g., a routing information signal identifying that the third communications device can route traffic signals to the second communications device. In some embodiments, the signal from the third communications device includes an identifier corresponding to the third device. Operation proceeds from step 422 to step 426.

In step 426, the first communications device transmits data, directed to the second communications device, to the third communications device. In various embodiments, the transmitted data includes user data. For example, the user data is data corresponding to voice, image, and/or a file and is communicated in a peer to peer traffic channel segment. In some embodiments, the transmitted paging signal of step 414 is transmitted at a higher per tone average power level than is the data transmitted in step 426. In some embodiments, the transmitted paging signal of step 414 is transmitted at a higher power level per information bit than the power level per information bit that the data transmitted in step 426 is transmitted at. In some embodiments, the transmitted paging signal of step 414 is transmitted at a higher total power level than the total power level that the data transmitted in step 426 is transmitted at. Operation proceeds from step 426 to step 404, where the first communications device monitors for presence indicator signals, e.g., during a subsequent interval used to communicate presence indicator signals.

Figure 4:
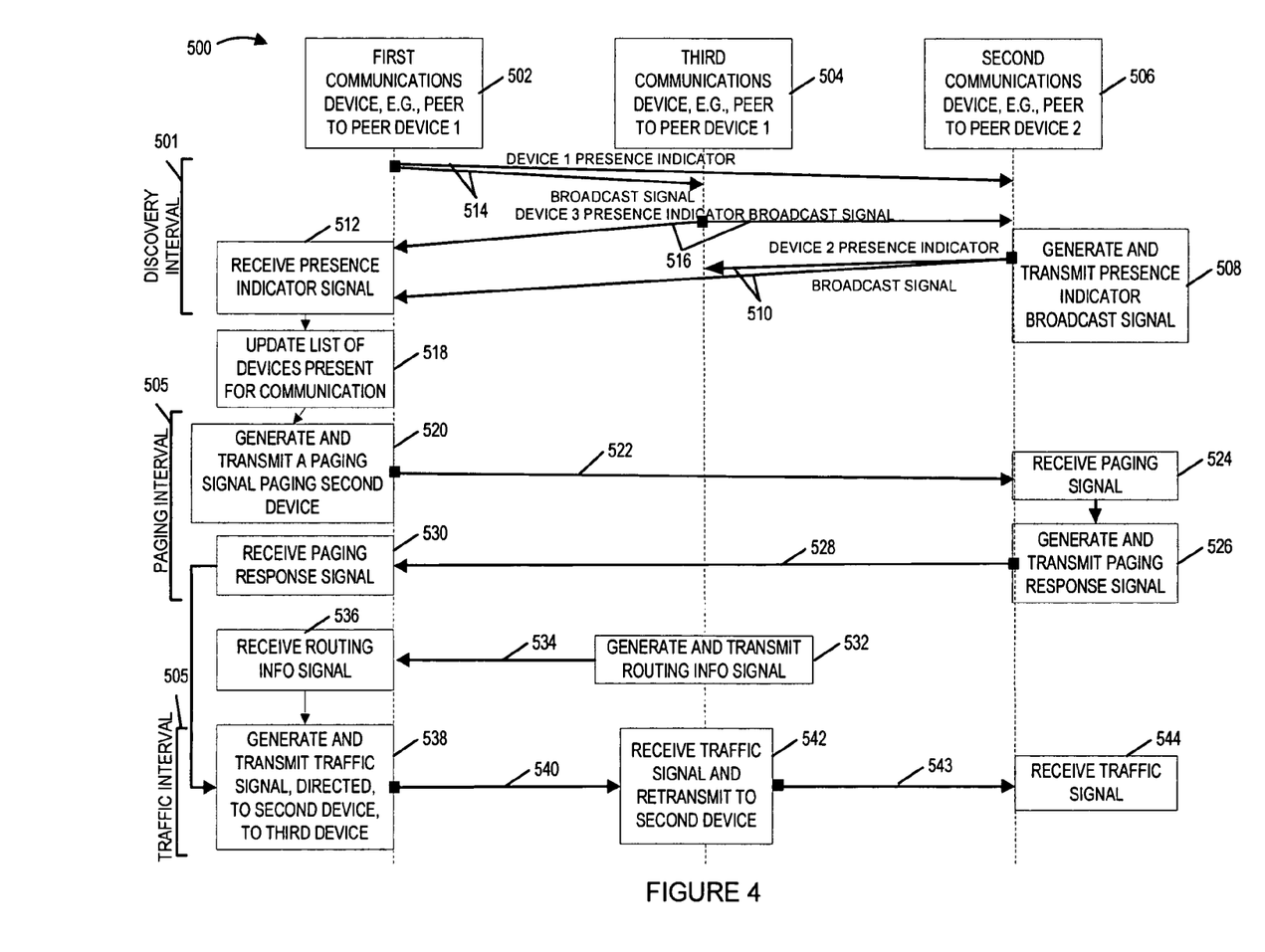
FIG. 4 is a drawing illustrating an exemplary communications network and exemplary signaling in accordance with one exemplary embodiment.

FIG. 4 is a drawing 500 illustrating an exemplary communications network and exemplary signaling in accordance with one exemplary embodiment. The exemplary communications network includes first, second and third communications devices (502, 504 and 506), e.g., peer to peer communications devices, which are situated in a region such that the third device 504 is located between the first and second devices (502, 506). In this example, the devices (502, 504, 506) in the network follow a recurring timing structure which includes a discovery interval 501, a paging interval 503, and a traffic interval 505. Devices (502, 504, 506) are, e.g., devices in accordance with device 200 of FIG. 200 and/or devices devices which implement the method of flowchart 400 of FIG. 3.

During the discovery interval 501 the device generate and transmit presence indicator broadcast signals. For example, second communications device generates and transmits a device 2 presence indicator broadcast signal 510 as indicated by box 508. Similarly first communications device 502 generates and transmits a device 1 presence indicator broadcast signal 514, and third communications device 504 generates and transmits a device 3 presence indicator broadcast signal 516.

First communications device 502 receives device 2 presence indicator signal 510 and device 3 presence indicator signal 516 as indicated by block 5 12. Similarly, second communications device 506 receives device 1 presence indicator signal 514 and device 3 presence indicator signal 516, and third communications device 504 receives device 1 presence indicator signal 514 and device 2 presence indicator signal 510.

In response to the received presence indicator signals, first communications device 502 updates a list identifying devices present with which the first device may communicate, as indicated by box 518. The first communications device decides that it would like to communicate traffic signals with the second communications device 506 and thus generates and transmits a paging signal 522 to the second communications device 506 during the paging interval 503 as indicated by block 520. The second communications device 506 receives the paging signal 522 as indicated by block 524, and decides to generate and transmit a paging response signal 528, e.g., a positive acknowledgement to the paging request as indicated by block 526. First communications device 502 receives the paging response signal 528 as indicated by block 530, which allows the first communications device 502 to proceed with communication of traffic to the second communications device 506.

The third communications device 504 generates and transmits a routing information signal 534 to the first communications device 502 as indicated by block 532. The routing information signal is, e.g., a signal indicating that third communications device is available to serve as an intermediary for the routing of traffic packets between the first communications device 502 and the second communications device 506. The routing information signal 534 is received by first communications device 502 as indicated by block 536. The first communications device 502 uses the routing information in determining routing for traffic signals directed to the second communications device 506. In this example, the first communications device 502 decides to transmit traffic information intended to be delivered to the second communications device 506 to the third communications device 504, which is available to serve as an intermediary. Thus the first communications device 502 generates and transmits traffic signal 540, directed to the second device 506, to the third communications device 504, as indicated by block 538. The third communications device 504 receives traffic signal 540, processes the signal 540 and retransmits the traffic information as traffic signal 543, as indicated by block 542. The second communications device 506 receives the traffic signal 543 and recovers the traffic data/information which was communicated by first communications device 502, as indicated by clock 544.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including or otherwise embodying machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

In some embodiments, the processor or processors, e.g., CPUs, of one or more devices, e.g., communications devices such as access nodes and/or wireless terminals, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first peer-to-peer communications device to communicate with a second peer-to-peer communications device, said first and second peer-to-peer communications device being in a region including a third peer-to-peer communications device, the method comprising:
receiving a presence indicator at said first peer-to-peer communications device communicated over an airlink directly from the second communications device;
transmitting a paging signal at a first power level from said first peer-to-peer communications device directly to said second peer-to-peer communications device over the airlink;
receiving, following transmission of said paging signal, a paging response signal over the airlink directly from the second peer-to-peer communications device in response to the paging signal;
transmitting a second presence indicator to said third peer-to-peer communication device;
receiving, after transmitting the second presence indicator to said third peer-to-peer communication device, a routing information signal from said third peer-to-peer communications device, the routing information signal indicating that said third peer-to-peer communications device is able to route data from said first peer-to-peer communications device to said second peer-to-peer communication device; and
transmitting data, at a second power level less than the first power level at which the paging signal is transmitted, directed to said second peer-to-peer communications device, directly from said first peer-to-peer communications device to said third peer-to-peer communications device based on the received routing information signal and based on the received paging response.

2. The method of claim 1, wherein said data includes user data.

3. The method of claim 1, wherein said paging signal is transmitted at a higher total power level than said data.

4. The method of claim 1, wherein said presence indicator is a signal which communicates an identifier corresponding to the second device.

5. The method of claim 4, wherein said presence indicator signal communicates only said identifier.

6. The method of claim 4, wherein said presence indicator signal communicates information in a set of information consisting of one or more of the following: i) one or more identifiers corresponding to said second communications device; ii) information indicating a type of the second device; iii) functionality supported by the second device; and iv) information used to interpret the content of the presence indicator signal.

7. The method of claim 4, further comprising:
updating a list of devices with which said first peer-to-peer communications device can communicate based on the received presence indicator.

8. The method of claim 1, wherein the routing information signal from the third peer-to-peer communications device includes an identifier corresponding to the third peer-to-peer communications device.

9. The method of claim 1, wherein the first peer-to-peer communications device and the second peer-to-peer communications device are mobile peer to peer wireless communication devices.

10. The method of claim 9, wherein the first peer-to-peer communications device and the second peer-to-peer communications device are configured to perform ad hoc peer to peer communication.

11. The method of claim 1, further comprising:
monitoring for said routing information based on said received paging response signal,
wherein the receiving of a routing information signal from said third peer-to-peer communications device is based on the monitoring for said routing information.

12. A first peer-to-peer communications device for communicating with a second peer-to-peer communications device, said first and second peer-to-peer communications device being in a region including a third peer-to-peer communications device, the first peer-to-peer communications device comprising:
a wireless receiver module configured to receive at said first peer-to-peer communications device a presence indicator communicated over an airlink directly from the second peer-to-peer communications device and receive a routing information signal from said third peer-to-peer communications device, the routing information signal being received after a second presence indicator is transmitted by the first peer-to-peer communications device and indicating that said third peer-to-peer communications device is able to route data from said first peer-to-peer communications device to said second peer-to-peer communication device;
a paging signal generation module configured to generate at said first peer-to-peer communications device a paging signal directed to said second peer-to-peer communications device;
a paging response processing module configured to process a received paging response signal received directly from the second peer-to-peer communications device in response to said paging signal;
a hopped route data signal generation module configured to generate data units directed from said first peer-to-peer communications device to said second peer-to-peer communications device to be communicated via the third peer-to-peer communications device;
a wireless transmitter module configured to transmit a second presence indicator to said third peer-to-peer communication device, transmit said paging signal at a first power level directly from said first peer-to-peer communications device to said second peer-to-peer communications device over the airlink, and transmit data units at a second power level less than the first power level at which the paging signal is transmitted, based on the received routing information signal and based on said paging response signal, directed to said second peer-to-peer communications device, to said third peer-to-peer communications device; and
a transmission power control module configured to control said wireless transmitter module to transmit said paging signal directly to said second peer-to-peer communications device at the first power level.

13. The first peer-to-peer communications device of claim 12, wherein said data units include user data.

14. The first peer-to-peer communications device of claim 12, further comprising:

a peer discovery module configured to determine if a received presence indicator signal is from the second peer-to-peer communications device.

15. The first peer-to-peer communications device of claim 12, further comprising:
a data transmission approval module configured to control the transmission of data directed to said second device to proceed in response to the received paging response signal when the received paging response signal represents a positive response.

16. The first peer-to-peer communications device of claim 14, wherein the transmission power control module is further configured to control said wireless transmitter module to transmit said paging signal at a higher total power level than said data units.

17. The first peer-to-peer communications device of claim 14, wherein said presence indicator is a signal which communicates an identifier corresponding to the second peer-to-peer communications device.

18. The first peer-to-peer communications device of claim 17, wherein said presence indicator signal communicates only said identifier.

19. The first peer-to-peer communications device of claim 17, wherein said presence indicator signal communicates information in a set of information consisting of one or more of the following: i) one or more identifiers corresponding to said second peer-to-peer communications device; ii) information indicating a type of the second peer-to-peer communications device; iii) functionality supported by the second peer-to-peer communications device; and iv) information used to interpret the content of the presence indicator signal.

20. The first peer-to-peer communications device of claim 17, further comprising:
a communications peer updating module configured to update a list of devices with which said first peer-to-peer communications device can communicate based on the received presence indicator.

21. The first peer-to-peer communications device of claim 17, further comprising:
a routing information recovery module configured to recover information from the third peer-to-peer communications device indicating that the third peer-to-peer communication device can act as an intermediary between the first and second peer-to-peer communications devices for the communication of data.

22. The first peer-to-peer communications device of claim 21, wherein the routing information signal from the third peer-to-peer communications device includes an identifier corresponding to the third peer-to-peer communications device.

23. The first peer-to-peer communications device of claim 12, wherein the first peer-to-peer communications device and the second peer-to-peer communications device are mobile peer to peer wireless communication devices.

24. The first peer-to-peer communications device of claim 23, wherein the first peer-to-peer communications device and the second peer-to-peer communications device are configured to perform ad hoc peer to peer communication.

25. A first peer-to-peer communications device for communicating with a second peer-to-peer communications device, said first and second peer-to-peer communications device being in a region including a third peer-to-peer communications device, the first peer-to-peer communications device comprising:
wireless receiver means for receiving a presence indicator communicated over an airlink directly from the second peer-to-peer communications device and for receiving a routing information signal from said third peer-to-peer communications device, the routing information signal being received after a second presence indicator is transmitted by the first peer-to-peer communications device and indicating that said third peer-to-peer communications device is able to route data from said first peer-to-peer communications device to said second peer-to-peer communication device;
paging signal generation means for generating a paging signal directed to said second peer-to-peer communications device;
paging response signal processing means for processing a received paging response signal received directly from said second peer-to-peer communications device over the airlink, the paging response signal being received in response to said paging signal;
hopped route data signal generation means for generating data units directed to said second peer-to-peer communications device to be communicated via the third peer-to-peer communications device; and
wireless transmitter means for transmitting the second presence indicator to said third peer-to-peer communication device, for transmitting said paging signal at a first power level directly to said second peer-to-peer communications device over the airlink, and for transmitting data units at a second power level less than the first power level at which the paging signal is transmitted, based on the received routing information signal and based on the received paging response, directed to said second peer-to-peer communications device, to said third peer-to-peer communications device.

26. The first peer-to-peer communications device of claim 25, wherein said data units include user data.

27. The first peer-to-peer communications device of claim 25, further comprising:
peer discovery means for determining if a received presence indicator signal is from the second peer-to-peer communications device.

28. The first peer-to-peer communications device of claim 25, wherein the first peer-to-peer communications device and the second peer-to-peer communications device are mobile peer to peer wireless communication devices.

29. The first peer-to-peer communications device of claim 28, wherein the first peer-to-peer communications device and the second peer-to-peer communications device are configured to perform ad hoc peer to peer communication.

30. A non-transitory computer readable medium storing computer executable code, comprising code for:
causing a computer in a first peer-to-peer communications device to receive a presence indicator communicated over an airlink directly from a second peer-to-peer communications device and to receive a routing information signal from a third peer-to-peer communications device, the routing information signal being received after a second presence indicator is transmitted by the first peer-to-peer communications device and indicating that the third peer-to-peer communications device is able to route data from the first peer-to-peer communications device to the second peer-to-peer communication device;
causing the computer in the first peer-to-peer communications device to control the first peer-to-peer communications device to transmit the second presence indicator to said third peer-to-peer communication device and to transmit a paging signal at a first power level directly to the second peer-to-peer communications device over the airlink, said first and second peer-topeer communications device being in a region including the third peer-to-peer communications device;

causing the computer in the first peer-to-peer communications device to receive a paging response signal, said paging response signal received directly over the airlink from the second peer-to-peer communications device in response to said paging signal; and causing the computer to control said first peer-to-peer communications device to transmit data at a second power level less than the first power level at which the paging signal is transmitted, directed to said second peer-to-peer communications device, to said third peer-to-peer communications device based on the received routing information signal.

31. The computer readable medium of claim 30, wherein said data includes user data.

32. The computer program product of claim 30, wherein the first peer-to-peer communications device and the second peer-to-peer communications device are mobile peer to peer wireless communication devices.

33. The computer program product of claim 32, wherein the first peer-to-peer communications device and the second peer-to-peer communications device are configured to perform ad hoc peer to peer communication.

34. An apparatus comprising:

a memory; and at least one processor for use in a first peer-to-peer communications device, the processor coupled to the memory and being configured to:

receive at said first peer-to-peer communications device a presence indicator communicated over an airlink directly from a second peer-to-peer communications device;

transmit from said first peer-to-peer communications device a paging signal at a first power level directly to the second peer-to-peer communications device over the airlink, said first and second peer-to-peer communications devices being in a region including a third peer-to-peer communications device;

receive at said first peer-to-peer communications device a paging response signal, said paging response signal received directly over the airlink from the second peer-to-peer communications device in response to said paging signal;

receive at said first peer-to-peer communications device, after transmitting a second presence indicator to said third peer-to-peer communication device, a routing information signal from the third peer-to-peer communications device, the routing information signal indicating that the third peer-to-peer communications device is able to route data from said first peer-to-peer communications device to said second peer-to-peer communication device; and transmit data, at a second power level less than the first power level at which the paging signal is transmitted, from said first peer-to-peer communications device, directed to said second peer-to-peer communications device, to said third peer-to-peer communications device based on the received routing information signal and based on said paging response signal.

35. The apparatus of claim 34, wherein said data includes user data.

36. The apparatus of claim 34, wherein the first peer-to-peer communications device and the second peer-to-peer communications device are mobile peer to peer wireless communication devices.

37. The apparatus of claim 36, wherein the first peer-to-peer communications device and the second peer-to-peer communications device are configured to perform ad hoc peer to peer communication.

\* \* \* \* \*